United States Patent [19]
Johnson et al.

[11] Patent Number: 5,555,426
[45] Date of Patent: Sep. 10, 1996

[54] METHOD AND APPARATUS FOR DISSEMINATING MESSAGES TO UNSPECIFIED USERS IN A DATA PROCESSING SYSTEM

[75] Inventors: William J. Johnson, Flower Mound; Robert S. Keller, Grapevine; Marvin L. Williams, Lewisville, all of Tex.

[73] Assignee: International Business Machines Corporation, Armonk, N.Y.

[21] Appl. No.: 393,597

[22] Filed: Feb. 23, 1995

Related U.S. Application Data

[63] Continuation of Ser. No. 818,189, Jan. 8, 1992, abandoned.

[51] Int. Cl.$^6$ ..................................... G06F 13/00
[52] U.S. Cl. ................... 395/200.15; 370/94.1; 340/825.06; 364/242.94; 364/284.3; 364/284.4; 364/DIG. 1
[58] Field of Search ..................... 395/800, 725, 395/700, 650, 600, 400, 275, 200, 200.15, 856–860; 364/400, 514; 340/825.04, 825.06, 825.13, 825.29, 825.34, 825.47; 379/40, 42, 89, 112, 118, 127; 370/54, 60, 92, 93, 94.1, 94.3

[56] References Cited

U.S. PATENT DOCUMENTS

| | | | |
|---|---|---|---|
| 4,994,985 | 2/1991 | Cree et al. | 364/514 |
| 5,017,917 | 5/1991 | Fisher et al. | 340/825.79 |
| 5,040,141 | 8/1991 | Yazima et al. | 364/400 |
| 5,093,918 | 3/1992 | Heyen et al. | 395/725 |
| 5,138,653 | 8/1992 | Le Clercq | 379/96 |
| 5,177,680 | 1/1993 | Tsukino et al. | 364/401 |

*Primary Examiner*—Mehmet B. Geckil
*Assistant Examiner*—Alpesh M. Shah
*Attorney, Agent, or Firm*—Norman L. Gundel

[57] ABSTRACT

The method and apparatus of the present invention permit users to associate conditions of interest, such as keywords or originator identities. In response to the sending of a message, the data processing system determines which user conditions are met by the message input into the system and may associate the identities of such users with the message. In one embodiment, the system returns to the sender of the message the identities of users whose conditions are met by the message. In another embodiment, the system routes the message to users whose conditions are met by the message and, optionally, returns a confirmation of the delivery of the message to the sender. In either embodiment, a user can designate himself as "invisible", so that the system will not report the invisible user's identity to the sender.

32 Claims, 4 Drawing Sheets

METHOD AND APPARATUS FOR DISSEMINATING MESSAGES TO UNSPECIFIED USERS IN A DATA PROCESSING SYSTEM

This application is a continuation of commonly owned application Ser. No. 07/818,189, filed Jan. 8, 1992 and now abandoned.

BACKGROUND OF THE INVENTION

1. Field of the Invention

The present invention relates in general to the field of data processing systems and in particular to data processing systems that permit recipient-defined conditions to determine recipients of messages within the data processing system.

2. Description of the Related Art

Data processing systems are well known in the prior art. Such systems may permit a plurality of computers or work stations to be simultaneously coupled, as by a network, to a central processor or, alternatively, permit multiple computers or work stations to be coupled together in a local area network. Such systems may permit the sharing of computer assets, resources or objects such as documents, data bases, files, programs, computational facilities, bulletin boards, or electronic mail facilities.

A data processing system may include an electronic mail system. In such a system, a message can be delivered to at least one explicitly identified recipient by supplying an electronic address. Electronic mail systems may permit a sender to send a message to more than one explicitly identified recipient by entering more than one electronic address or by selecting one or more pre-defined distribution lists.

However, electronic mail systems as described require the sender to explicitly identify all recipients of a message and therefore require the sender of the message to know who would want to receive the message. Electronic mail systems as described are inherently exclusionary. The distribution of messages in such systems is confined to those recipients designated by the originator of the message.

Many enterprises desire an electronic distribution system that is not exclusionary. Thus, a data processing system may include an electronic bulletin board that allows persons who are users of the system to seek information from a central repository. In a bulletin board system, the dissemination of a message from a sender to an undesignated user requires two separate steps: the sender must first send the message to the repository and then the interested user, who may not know that a message has been sent, must subsequently discover and retrieve the message by searching the repository.

Delay is inherent in a bulletin board system as described. The message is not disseminated to an undesignated user at the time that it is sent to the repository by the sender—the message must wait for the interested, but undesignated, user to discover it in the central repository, as through the execution of a search routine. A search routine may be directly initiated by the user, and some data processing systems allow a user to input a search strategy for subsequent, and optionally repetitive, execution at a specified later time or times.

A method and apparatus are desired in which a sender may send a message to an interested but undesignated user without delay and also in which an undesignated user may receive messages of interest concurrently with the sending of the message by the sender, even though the sender of the message has not explicitly identified that user as an addressee of the message and may not even know that the user is interested in receiving the message.

SUMMARY OF THE INVENTION

It is, therefore, one object of the present invention to provide an improved electronic mail system.

It is another object of the present invention to provide a method and apparatus for permitting a sender to send a message directly to other users of the data processing system who are interested in receiving the message but who have not been explicitly identified by the sender.

It is another object of the present invention to provide a method and apparatus for initiating the execution of a predefined search strategy as a result of the receipt of a message by the data processing system and for routing the message to users associated with a search strategy whose conditions are met by the message.

It is yet another object of the present invention to provide a method and apparatus for permitting a user to receive messages of interest to the user at the time such messages are sent by the sender.

The foregoing objects are achieved as is now described. The method and apparatus of the present invention permit users to associate conditions of interest, such as keywords or originator identities. In response to the sending of a message, the data processing system determines which user conditions are met by the message input into the system and may associate the identities of such users with the message. In one embodiment, the system returns to the sender of the message the identities of users whose conditions are met by the message. In another embodiment, the system routes the message to users whose conditions are met by the message and, optionally, returns a confirmation of the delivery of the message to the sender. In either embodiment, a user can designate himself as "invisible", so that the system will not report the invisible user's identity to the sender.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
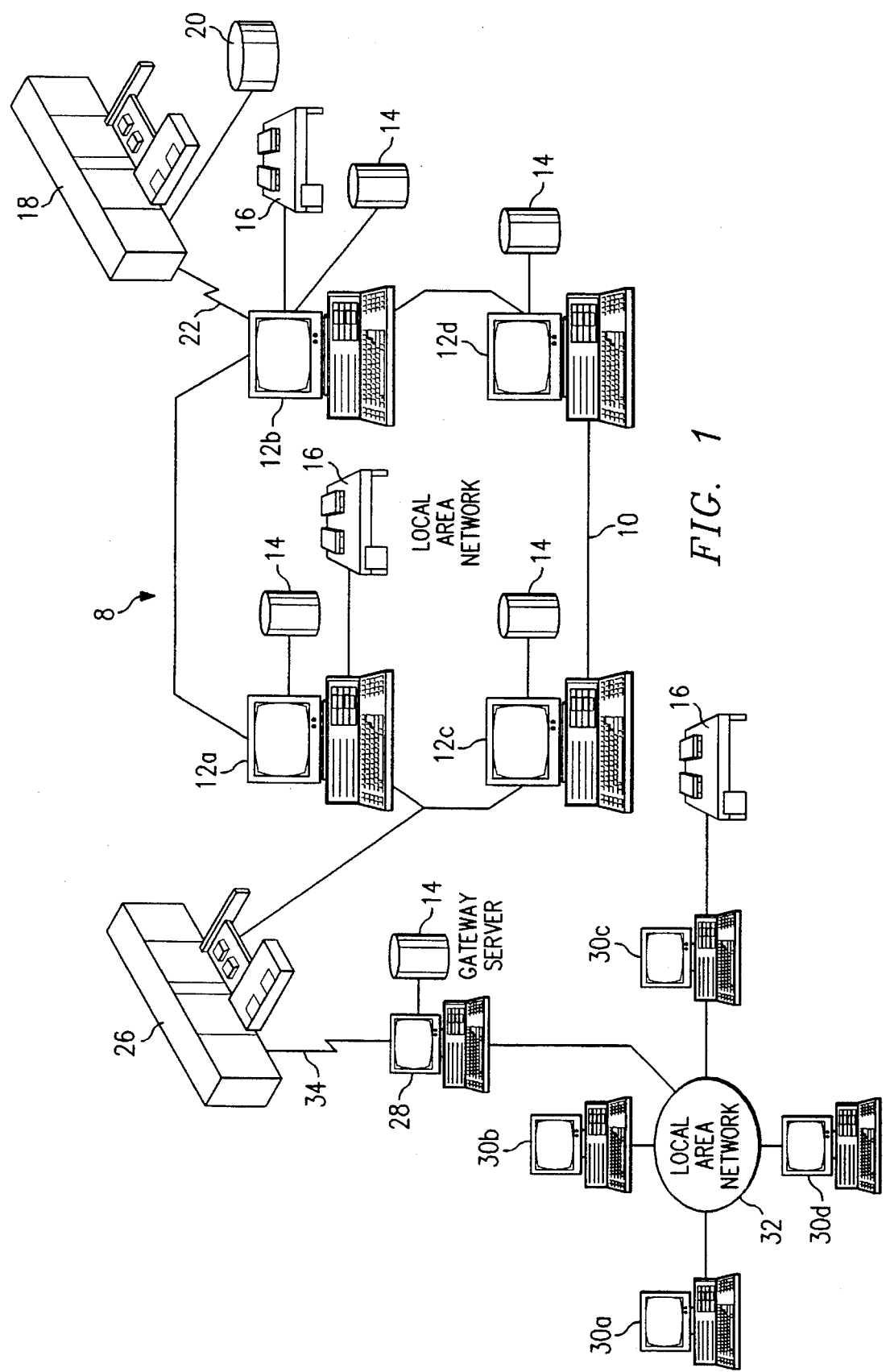
FIG. 1 depicts a pictorial representation of a data processing system which may be utilized to implement the method and apparatus of the present invention.

With reference now to the figures, and in particular with reference to FIG. 1, there is shown a pictorial representation of a data processing system 8 which may be utilized to implement the method and apparatus of the present invention. As may be seen, data processing system 8 may include a plurality of networks, such as local area networks 10 and 32, each of which preferably includes a plurality of individual computers 12a, 12b, 12c and 12d and 30a, 30b, 30c and 30d, respectively. Of course, those skilled in the art will appreciate that a plurality of intelligent work stations coupled to a host processor may be utilized for each such network.

As is common in such data processing systems, each individual computer may be coupled to a storage device 14 and/or a printer/output device 16. One or more such storage devices 14 may be utilized to store various documents or software applications, which may be accessed by a client user within the data processing system 8.

Still referring to FIG. 1, it may be seen that data processing system 8 may also include multiple mainframe computers, such as mainframe computer 18, which may be preferably coupled to local area network 10 by means of communications link 22. Mainframe computer 18 may also be coupled to a storage device 20 which may serve as remote storage for local area network 10 and may also be coupled via communications controller 26 and communications link 34 to a gateway server 28. Gateway server 28 is preferably an individual computer or intelligent work station which serves to link local area network 32 to local area network 10.

Still referring to FIG. 1, the data processing system 8 preferably also includes an electronic mail system. Such a system allows electronic transmission of messages between persons who are users of the data processing system. A user, called a sender, can send a message to one or more other users of the data processing system, called recipients. Typically, a sender of such a message in an electronic mail system will explicitly identify each intended recipient of the message by name or electronic address or both. The electronic mail system may also permit a sender to specify recipients through the selection of a pre-established distribution list. Such a distribution list may be merely a collection of names or electronic addresses. Selection of a distribution list will cause the message to be routed to the users identified as recipients on the distribution list just as though the sender had separately entered each of the names or electronic addresses of those recipients at the time he sent the message.

When a sender sends a message, the message is transmitted from the sending user, at, for example, computer 12a, to a general service node at, for example, mainframe computer 18. Messages addressed to other users of the same general service node are typically sent directly to the other users by the general service node. Messages addressed to users of another general service node are sent to a second general service node in accordance with a routing table maintained by the first general service node. Such a routing table may specify, for each destination general service node, the intermediate general service node to which messages intended for the destination general service node should be routed. If an intermediate general service node is different from the destination general service node, the process will be repeated at each intermediate general service node until the destination general service node is reached, at which point the destination general service node will route the message to the intended recipient user.

The prior art electronic mail system described above requires the sender to explicitly identify all desired recipients of a message. The method and system to be described below also allow a sender to designate his message as "public". A "public" electronic mail message will be routed, by the local service node, to a disseminator, as described below, where users who are interested in receiving the message will be identified. The message will then be delivered, by an electronic mail system such as the one described above, to each identified interested user.

The method and system described below also optionally allow the sender to learn who will receive a message before the message is sent. The sender may in this manner learn who is interested in receiving the message and to how many persons the message will be delivered. An optional confirmation-of-delivery is also provided. The method and system, however, also permit a potential recipient user to make himself invisible to senders, so that his name will not be reported to a sender either as a potential recipient or as confirmation of delivery. This option is provided because a potential recipient user may not want others to know that he is reviewing a message or that he is interested in a particular topic.

The disseminator itself includes a table in which certain conditions of interest are registered or associated with the identities of users desiring to receive certain information. As will be described below, the data processing system may be provided with one or more disseminators.

Figure 2:
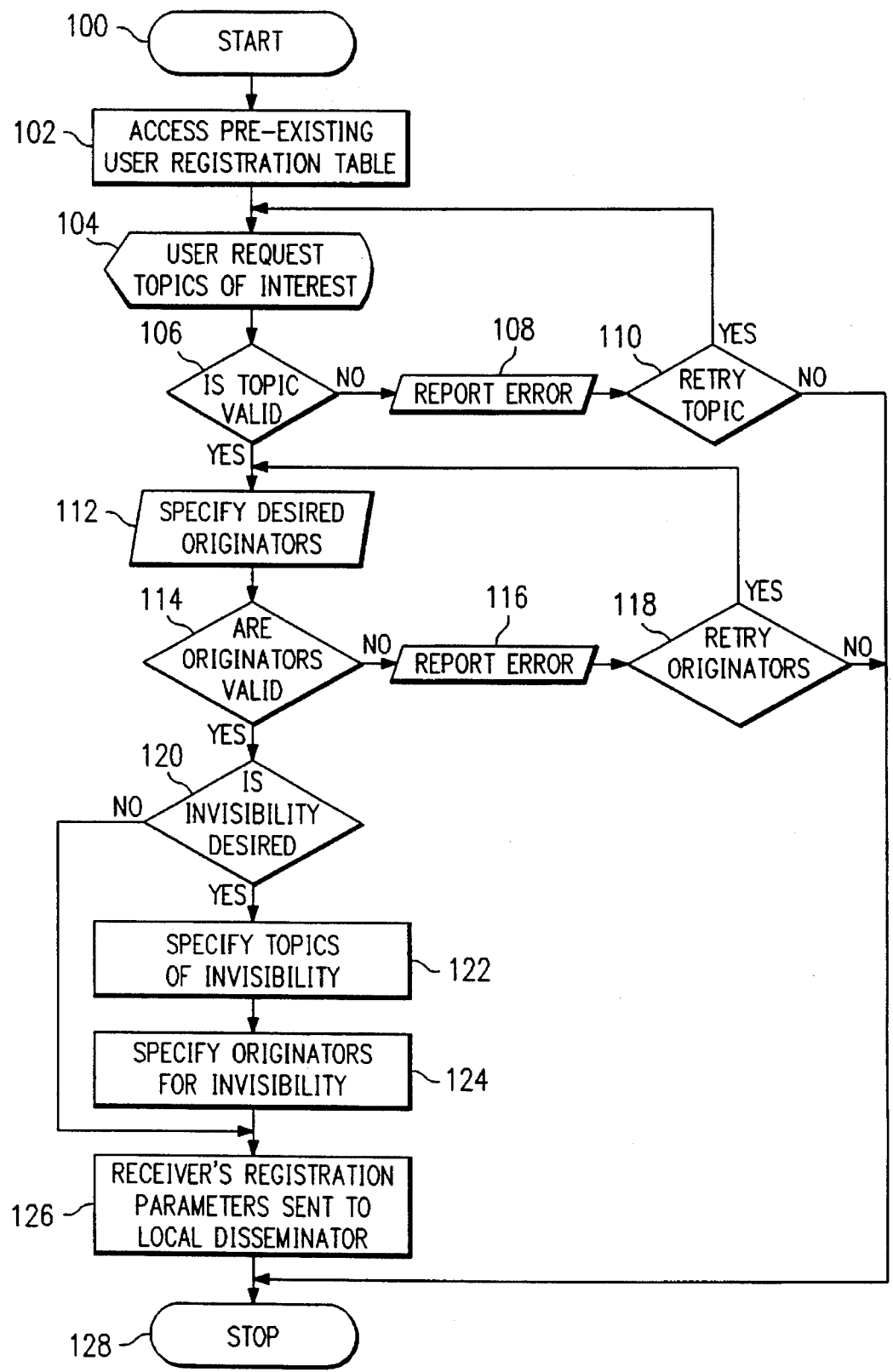
FIG. 2 is a high level flow chart illustrating a method and apparatus for entering conditions of interest to the data processing system.

With reference now to FIG. 2, there is depicted a high level flow chart which illustrates a user's registration of conditions of interest with the disseminator. Each user's registered conditions of interest, or criteria, will be the standard used by the system to determine whether a message is of interest to that user. The registration may typically include topic keywords or originator identities or both.

The registration process begins in FIG. 2 at block 100 with a user initiating the registration process by accessing the local disseminator at mainframe computer 18. Next, the process passes to block 102, where the pre-existing user registration table maintained by the local disseminator is accessed and any previous conditions that the user may have already registered (by previous use of the invention) are returned to the user. This allows the user not only to register a new condition but also to edit or delete a previously registered condition.

Next, the process passes to block 104, in which the user inputs topics of interest. Topics of interest may be a search strategy of one or more keywords. As will be described below, this topic of interest may be evaluated against a list of subject terms associated with a message, or, alternatively, against the full text of the message. In one embodiment, keywords may be selected from a pre-defined list of such keywords. Alternatively, keywords that have not been pre-defined may also be used. Truncation of keywords may be permitted, including truncation of leading characters, trailing characters or intermediate characters. If multiple keywords are specified, boolean operators and proximity operators may be used. Parentheses may be used to establish priority of evaluation of operators. Proximity operators may include same sentence and same paragraph, either in any order or a specified order, as well as within a specified number of words, in any order or in a specified order. Topics of interest input by the user may be newly entered or may be edited from a pre-existing registration, which may itself be retained, replaced or deleted.

The process next proceeds to block 106, in which the validity of the condition input by the user is evaluated by the disseminator. Validity may be determined by comparison of the user specified keywords against a pre-defined list, if a pre-defined list is provided. Additionally, validity may be determined by comparison of the user specified keywords with truncation rules or a spelling checker. If boolean operators are used, the validity of the boolean expression may be evaluated. Logical consistency may be evaluated, as, for example, by requiring equal numbers of open and closed parentheses. Optionally, parentheses may be inserted into the condition so that a user may know whether the system will evaluate, for example, the expression "A and B or C" as "(A and B) or C" or as "A and (B or C)".

If the evaluation performed in block 106 determines that a condition input by the user is not valid, the process proceeds to block 108, in which the invalidity of the condition is reported to the user. The process next proceeds to block 110 in which the user must specify whether he wishes to retry entry of a topic. If the user responds negatively, the process proceeds to block 128 and the process is terminated. Alternatively, if the user responds affirmatively, the process returns to block 104 and the user may input new topics of interest, either by editing the invalid condition, editing a pre-existing registration, or beginning over, all as described above.

If the evaluation performed in block 106 determines that the topic is valid, the process proceeds from block 106 to block 112, in which the user is permitted to specify desired originators. Originators typically include the explicitly identified authors or senders of messages but may also optionally include explicitly identified message recipients or copy recipients. Originators may either be newly input in block 112 or edited from a pre-existing registration returned to the user in block 102, which may be supplemented, replaced or deleted. Originators may optionally be selected from a list of originators. Optionally, originators may be designated by function, position, rank, or group as well as by name or electronic address.

The process proceeds from block 112 to block 114 for evaluation of the validity of the designation of originators, as by determining whether the explicitly identified originators actually exist or have been misspelled. If any invalidity is detected in block 114, the process proceeds next to block 116 and reports the error to the user. The process proceeds next to block 118, in which the user must specify whether he wishes to retry entry of originators. If the user responds affirmatively, the process returns to block 112 and allows the user to specify originators, either by new entry or by editing either the invalid entry or a pre-existing registration, as previously described. If the user in block 118 does not wish to retry entry of originators, the process proceeds to block 128 and terminates.

If it is determined in block 114 that the originators entered into the system are valid, the process proceeds next to block 120 where it is determined whether the user has requested invisibility. If the user has requested invisibility, the process proceeds next to block 122 where invisibility may be associated with specific topics and next to block 124 where invisibility may be associated with specific originators in the registration request. The process next proceeds to block 126.

If in block 120 it is determined that the user has not requested invisibility, the process proceeds from block 120 directly to block 126. At block 126, the process sends the user's registration request to the local disseminator in mainframe computer 18, where it will be processed as described below and in FIG. 4. The process next proceeds to block 128 and terminates.

Figure 3:
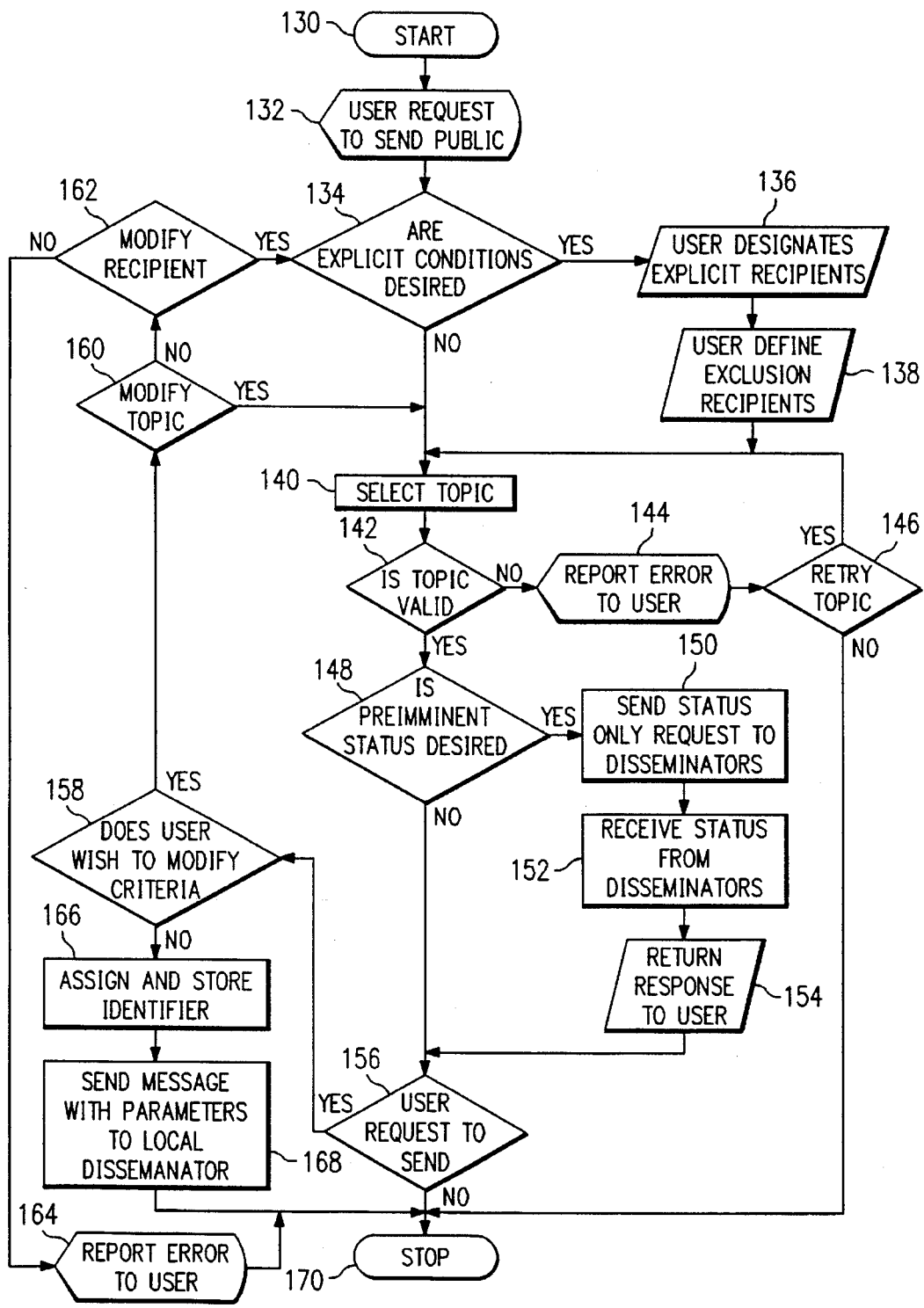
FIG. 3 is a high level flow chart illustrating a method and apparatus for entering messages to the data processing system.

Turning now to FIG. 3, the process for sending a message starts at block 130 and next proceeds to block 132 in which the user, at, for example, computer 12b, enters the text of the message and initiates a request to send a public message. The process next proceeds to block 134 in which the user specifies whether he also desires to send the message using explicit addressing, as in conventional electronic mail. If the user does desire explicit addressing, the process next proceeds to block 136 in which the user is permitted to designate explicit recipients, either by name or electronic address or through selection of a pre-defined distribution list. The process next proceeds to block 138, in which the user is permitted to enter any potential recipients who should not receive the message. The process next proceeds to block 140.

If the user does not specify in block 134 that explicit addressing is desired, the process proceeds directly from block 134 to block 140. In block 140, in one embodiment, the user may input topic keywords. Topic keywords associated with the message may be compared against user conditions in the user registration table, as described below and in FIG. 4, to determine which users are interested in receiving the message. These keywords, in one embodiment, may be selected from a pre-defined list of keywords or, alternatively, may be keywords of the user's choosing. Truncation of keywords may optionally be permitted. In an alternative embodiment, input of keywords is not required, as the text of the message itself will be analyzed.

The process next proceeds to block 142, in which validity of the topic entered by the user is determined, as by comparing keywords entered by the user against a pre-defined list of keywords or a spelling checker or truncation rules. If the topic entered is not valid, the process proceeds to block 144 in which the error is reported to the user and next to block 146 where the user must specify whether he wishes to retry the topic entry. If the user elects to retry the topic entry, the process proceeds to block 140 as previously described. If the user elects not to retry the topic entry, the process proceeds to block 170 and the process terminates.

If it is determined in block 142 that the topic entry is valid, the process next proceeds to block 148, where the user specifies whether a status inquiry is desired. A pre-imminent status inquiry will return to the user a list of all non-invisible recipients of the proposed public message without actually sending the message. If the user input is affirmative, the process next proceeds to block 150 where a message is sent to the local disseminator. The message is processed by the disseminator, as described below and shown in FIG. 4. This process next proceeds to block 152 when a return message is received from the local disseminator reporting all non-invisible recipients. The process next proceeds to block 154 and reports the non-invisible recipients to the user. The process next proceeds to block 156.

If the user did not specify a status inquiry, the process proceeds directly from block 148 to block 156, in which the user specifies whether to send the public message. If the user specifies that the message should not be sent, the process proceeds directly from block 156 to block 170 and terminates without sending the message.

If the user specifies in block 156 that the message should be sent, the process proceeds from block 156 to block 158, in which the sender inputs whether he wishes to modify the specified topics or explicit recipients of the message. If modification is desired, the process proceeds to block 160 in which the user may elect to modify the specified topic. If the user elects to modify the specified topic, the process proceeds to block 140 and the user may select a topic as previously described.

If the user elects not to modify the specified topic, the process instead proceeds from block 160 to block 162, where the user may elect to modify the specified explicit recipients. If the user elects to modify the specified recipients, the process proceeds from block 162 to block 134, and the user may specify or modify explicit recipients, as previously described. If the user does not elect to modify the explicit recipients, the process proceeds from block 162 to block 164, in which an error is reported, as the user stated that he desired to modify the conditions but did not enter any changes. The process then proceeds to block 170, where the process terminates.

If the user does not elect in block 158 to modify the conditions, the process proceeds from block 158 to block 166, in which a unique identifier or accession number is assigned to the message. The process then proceeds to block 168, in which the public message is sent to the local disseminator, where it is processed as described below and in FIG. 4. The process then proceeds to block 170 and terminates.

Figure 4:
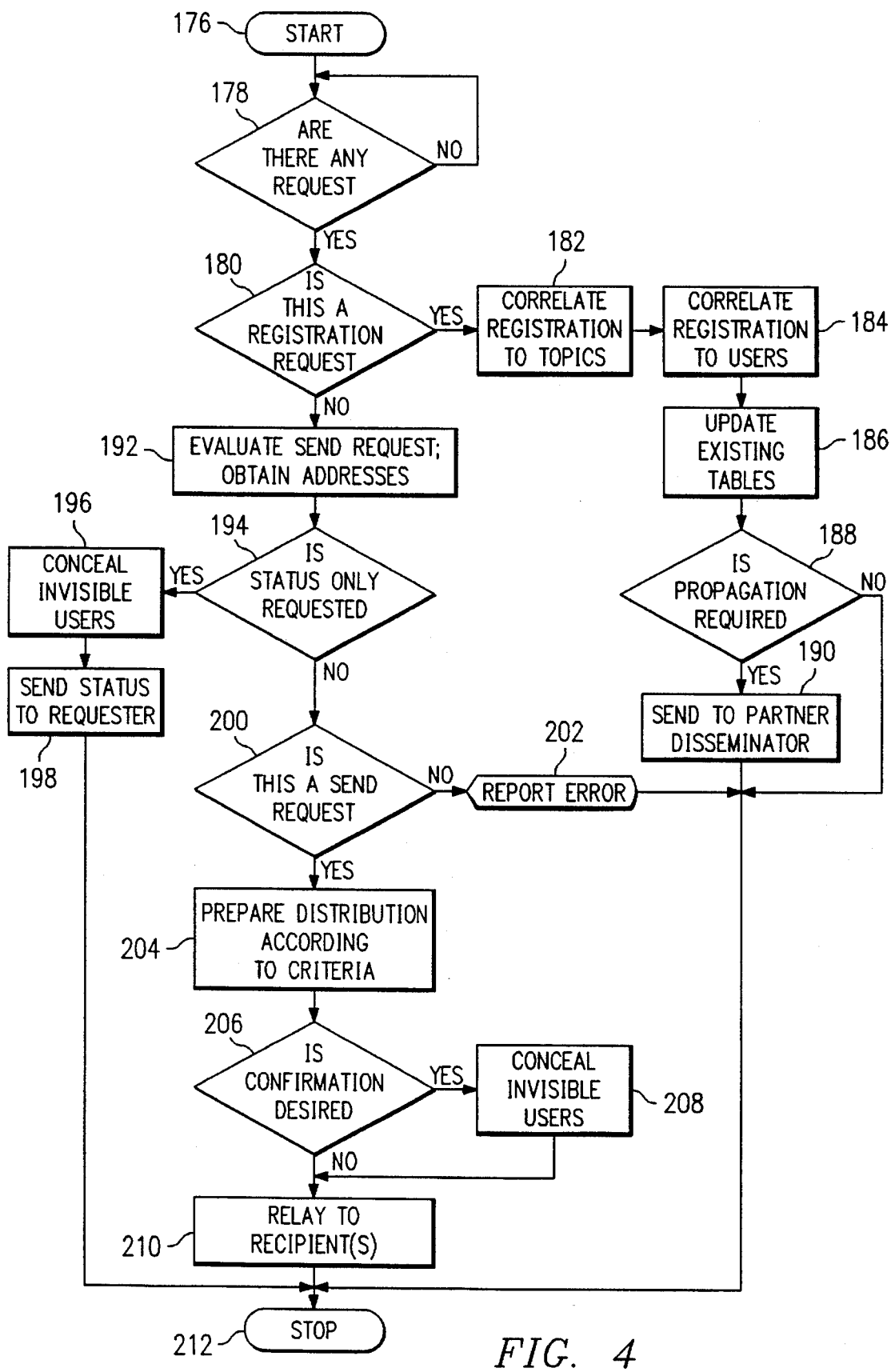
FIG. 4 is a high level flow chart illustrating a method and apparatus for registering conditions of interest and disseminating messages to users and returning identities to originators.

Turning now to FIG. 4, the processing of messages received at the local disseminator begins at block 176 and proceeds to block 178 where the local disseminator waits to receive a message. When a message is received, the process proceeds to block 180 for a determination of whether the message is a registration request as described above and shown in FIG. 2. If the message is a registration request, the process proceeds to block 182, in which the topic keywords in the registration request are optionally correlated to keywords on a pre-existing list of keywords. The process next proceeds to block 184, in which any originator identities associated with the registration request are optionally correlated to users of the system. The process next proceeds to block 186, in which the existing registration table at the local disseminator is updated with the topics and originators of this registration request.

The process next proceeds to block 188, in which it is determined whether propagation to partner disseminators is required. In a multiple disseminator system, each disseminator's registration table should optimally be identical, as messages are ordinarily processed at the local disseminator. Thus, if a registration request was received directly from a local user in a multiple disseminator system, propagation to all other disseminators is desired and the process proceeds to block 190. In block 190, the disseminator forwards the registration request to all other disseminators by explicitly addressing them through the electronic mail system. The process then proceeds to block 212 and terminates.

If, however, in block 188, it is determined that the system includes only one disseminator or that the registration request was received not from a user but from a propagating disseminator and that further propagation is not required, the system proceeds directly from block 188 to block 212 and terminates.

If it was determined in block 180 that the message is not a registration request, the process proceeds from block 180 directly to block 192, in which the message is evaluated against the registration table at the local disseminator and a list is obtained of the electronic addresses to which the message would be sent. These electronic addresses are those of the users whose registered conditions of interest, or criteria, are met by the message being processed and also any users who have been explicitly addressed by the sender.

Next, the process proceeds to block 194 in which it is determined whether the message requests only public status. If so, the process proceeds to block 196, in which any invisible users on the list of addressees are suppressed. Next, the process proceeds to block 198, in which the remaining addressees on the list are routed to the requester at block 152 of FIG. 3. Finally, the process proceeds to block 212 and terminates.

If the message is not a public status request, the process proceeds from block 194 to block 200, where it is determined whether the message is a public send request. If the message is not a public send request, the process proceeds to block 202 and reports an error to the user, and then proceeds to block 212 and terminates.

If the message is a public send request, the process proceeds from block 200 to block 204 in which the message is formatted for distribution through the electronic mail system to the list of addressees. The process next proceeds to block 206, where it is determined whether the sender requested confirmation of delivery of the message. If confirmation was requested, the process proceeds to block 208, in which invisible users are concealed and a confirmation of delivery request is associated with the non-invisible users on the list of addressees. The process then proceeds from block 208 to block 210.

If confirmation of delivery is not desired, the process proceeds directly from block 206 to block 210. In block 210, the message is routed to the addressees using the electronic mail system. The process next proceeds to block 212 and terminates.

Upon reference to the foregoing, it will be appreciated that the applicants have provided a novel and useful method and apparatus whereby a user of a data processing system may send a message to other users of the system who are interested in the message but may be unknown to the user and whereby users of the system may receive messages of interest to them at the time the messages are sent without requiring later user-initiated or previously scheduled searches of a bulletin board. While the invention has been particularly shown and described with reference to a preferred embodiment, it will be understood that various changes in form and detail may be made therein without departing from the spirit and scope of the invention.

What is claimed is:

1. A method, performed in a data processing system, of disseminating a message sent by a sender, said message including addresses and content, wherein said addresses includes information pertaining to the sender of said message and all desired recipients of said message that were explicitly specified by the sender of said message, and wherein said content includes the remainder of the message other than said addresses, the method comprising the computer implemented steps of:

associating a message content condition with an identity of a user of the data processing system;

comparing the content of the message sent to a message content condition previously associated with the identity of a user to determine whether the condition is met by the content of the message;

determining whether the condition is met by the content of the message;

associating with the message the identity of a nonspecified user whose user identity is associated with a condition that is met by the content of the message, wherein a nonspecified user is a user who was not explicitly specified by the sender of the message as a desired recipient of the message; and routing the message to the nonspecified user whose nonspecified user identity is associated with the message, as a result of the association of a user identity with the message, wherein a nonspecified user identity is the user identity of a nonspecified user.

2. A method as in claim 1, further comprising the computer implemented step of:

compiling a list of nonspecified user identities associated with the message.

3. A method as in claim 1, further comprising the computer implemented step of:

reporting, to the sender of the message, the nonspecified user identity associated with the message, as a result of the association of the nonspecified user identity with the message.

4. A method as in claim 1, further comprising the computer implemented steps of:

suppressing a nonspecified user identity, associated with the message, of a nonspecified user who has requested invisibility; and reporting, to the sender of the message, only an unsuppressed nonspecified user identity associated with the message, as a result of the association of a nonspecified user identity with the message.

5. A method as in claim 1, further comprising the computer implemented step of:

reporting, to the sender of the message, delivery of the message to the nonspecified user whose user identity is associated with the message.

6. A method as in claim 1, further including the computer implemented steps of:

delivering the message to the nonspecified user whose user identity is associated with the message, as a result of the association of the nonspecified user identity with the message; and reporting, to the sender of the message, delivery of the message to the nonspecified user whose user identity is associated with the message, as a result of delivery of the message.

7. A method as in claim 1, further including the computer implemented step of:

reporting, to the sender of the message, delivery of the message to a nonspecified user who has not requested invisibility and whose nonspecified user identity is associated with the message.

8. A method as in claim 1, further including the computer implemented steps of:

delivering the message to the nonspecified user whose user identity is associated with the message, as a result of the association of the nonspecified user identity with the message; and reporting, to the sender of the message, as a result of delivery of the message, the delivery of the message to a nonspecified user who has not requested invisibility and whose user identity is associated with the message.

9. A method as in claim 1, further including the computer implemented steps of:

routing the message to the nonspecified user whose user identity is associated with the message, as a result of the association of the nonspecified user identity with the message; and reporting, to the sender of the message, as a result of delivery of the message, only the delivery of the message to a nonspecified user who has not requested invisibility and whose user identity is associated with the message.

10. A method as in claim 1, further including the computer implemented step of:

suppressing the message sender's access to the association with the message of the user identity of a nonspecified user who has requested invisibility.

11. A method, performed in a data processing system, of disseminating a message sent by a sender, said message including addresses and content, wherein said addresses includes information pertaining to the sender of said message and all desired recipients of said message that were explicitly specified by the sender of said message, and wherein said content includes the remainder of the message other than said addresses, the method comprising the computer implemented steps of:

associating a message content condition with an identity of a user of the data processing system;

comparing the content of the message sent to a message content condition previously associated with an identity of a user to determine whether the condition is met by the content of the message; and delivering the message to a user whose user identity is associated with a condition that is met by the content of the message and who is not a desired recipient of the message, as a result of the meeting of the condition by the content of the message.

12. A method as in claim 11, further comprising the computer implemented step of:

reporting to the sender of the message the identity of a user who is not an explicitly specified desired recipient of the message and whose user identity is associated with a condition that is met by the content of the message.

13. A method as in claim 11, further comprising the computer implemented step of:

reporting, to the sender of the message, the identity of a user who is not an explicitly specified desired recipient of the message and whose user identity is associated with a condition that has been met by the content of the message and who has not requested invisibility.

14. A method as in claim 11, further comprising the computer implemented step of:

reporting, to the sender of the message, as a result of delivery of the message, a confirmation of delivery of the message to a user who is not an explicitly specified desired recipient of the message and whose user identity is associated with a condition that is met by the content of the message.

15. A method as in claim 11, further comprising the computer implemented step of:

reporting, to the sender of the message, as a result of delivery of the message, a confirmation of delivery of the message to a user who is not an explicitly specified desired recipient of the message and whose user identity is associated with a condition that is met by the content of the message and who have not requested invisibility.

16. A method as in claim 1 or 11, further including the computer implemented step of:

associating a topic with the message, said topic including a keyword selected from a list of keywords.

17. A method as in claim 1 or 11, in which a condition includes a keyword selected from a list of keywords.

18. A method as in claim 1 or 11, in which a condition includes an identity of a user.

19. A method as in claim 1 or 11, in which a condition includes a boolean expression.

20. A data processing system for disseminating a message sent by a sender, said message including addresses and content, wherein said addresses includes information pertaining to the sender of said message and all desired recipients of said message that were explicitly specified by the sender of said message, and wherein said content includes the remainder of the message other than said addresses, said system comprising:

means for associating a message content condition with a user identity of a user of the system;

means for comparing the content of the message sent to a message content condition previously associated with an identity of a user and determining whether the condition is met by the content of the message; and means for associating with the message the identity of a user who is not an explicitly specified desired recipient of the message and whose user identity is associated with a condition that is met by the content of the message.

21. A data processing system as in claim 20, further comprising:

means for reporting, to the sender of the message, a user identity of a user who is not an explicitly specified desired recipient of the message and whose user identity is associated with the message.

22. A data processing system as in claim 20, further comprising:

means for suppressing a user identity of a user who is not an explicitly specified desired recipient of the message and whose user identity is associated with the message and who has requested invisibility; and means for reporting, to the sender of the message, a user identity of a user who is not an explicitly specified desired recipient of the message and whose user identity is associated with the message and who has not requested invisibility.

23. A data processing system as in claim 20, further comprising:

means for routing the message to a user who is not an explicitly specified desired recipient of the message and whose user identity is associated with the message, as a result of the association of the user identity with the message.

24. A data processing system as in claim 20, further comprising:

means for delivering the message to a user who is not an explicitly specified desired recipient of the message and whose user identity is associated with the message, as a result of the association of the user identity with the message; and means for reporting, to the sender of the message, as a result of delivery of the message, delivery of the message to a user who is not an explicitly specified desired recipient of the message and whose user identity is associated with the message.

25. A data processing system as in claim 20, further comprising:

means for delivering the message to a user who is not an explicitly specified desired recipient of the message and whose user identity is associated with the message, as a result of the association of the user identity with the message; and means for reporting, to the sender of the message, as a result of delivery of the message, the identity of a user who is not an explicitly specified desired recipient of the message and who received the message and who has not requested invisibility.

26. A data processing system for disseminating a message sent by a sender, said message including addresses and content, wherein said addresses includes information pertaining to the sender of said message and all desired recipients of said message that were explicitly specified by the sender of said message, and wherein said content includes the remainder of the message other than said addresses, said system comprising:

means for associating a message content condition with a user identity of a user of the system;

means for comparing the content of the message sent to a message content condition previously associated with an identity of a user and determining whether the condition is met by the content of the message; and means for delivering the message to a user who is not an explicitly specified desired recipient of the message and whose user identity is associated with a condition that is met by the content of the message, as a result of the meeting of the condition by the content of the message.

27. A data processing system as in claim 26, further comprising:

means for reporting, to the sender of the message, as a result of delivery of the message, delivery of the message to a user who is not an explicitly specified desired recipient of the message and whose user identity is associated with a condition that is met by the content of the message.

28. A data processing system as in claim 26, further comprising:

means for reporting, to the sender of the message, as a result of delivery of the message, delivery of the message to a user who is not an explicitly specified desired recipient of the message and whose user identity is associated with a condition that is met by the message and who has not requested invisibility.

29. A data processing system as in claim 20 or 26, further comprising means for associating a topic with the message, said topic including a keyword selected from a list of keywords.

30. A data processing system as in claim 20 or 26, in which a condition includes a keyword selected from a list of keywords.

31. A data processing system as in claim 20 or 26, in which a condition includes an identity of a user.

32. A data processing system as in claim 20 or 26, in which a condition includes a boolean expression.

\* \* \* \* \*